United States Patent [19]
Waid

[11] 3,747,678
[45] July 24, 1973

[54] CONSOLIDATING RESERVOIR FORMATION SAND WITH UNDERDISPLACED RESIN

[75] Inventor: John M. Waid, Houston, Tex.

[73] Assignee: Shell Oil Company, New York, N.Y.

[22] Filed: Apr. 16, 1971

[21] Appl. No.: 134,782

[52] U.S. Cl. .............................................. 166/295
[51] Int. Cl. ............................................ E21b 33/13
[58] Field of Search ...................... 166/295, 276, 285

[56] References Cited
UNITED STATES PATENTS

| 3,294,166 | 12/1966 | Havenaar | 166/295 |
| 3,247,900 | 4/1966 | Perry | 166/295 X |
| 3,587,742 | 6/1971 | Wittenwyler | 166/295 |
| 3,223,162 | 12/1965 | Burge | 166/295 X |
| 3,548,942 | 12/1970 | Terry | 166/276 |
| 3,212,577 | 10/1965 | Holbert | 166/295 |

Primary Examiner—Robert L. Wolfe
Attorney—H. W. Coryell and Harold L. Denkler

[57] ABSTRACT

In a sand consolidating treatment of a cased and perforated well, a resin-forming solution that subsequently precipitates a self-curing partially polymerized resin is pumped into the well and into the sand so that enough resin solution is left within the casing of the well to substantially fill the perforated interval adjacent to the sand.

4 Claims, 2 Drawing Figures

3,747,678

CONSOLIDATING RESERVOIR FORMATION SAND WITH UNDERDISPLACED RESIN

BACKGROUND OF THE INVENTION

The invention relates to treating wells cased and perforated wells to prevent an inflow of "sand" (i.e., solid particles) from an unconsolidated reservoir formation.

Many wells are completed into unconsolidated reservoirs and numerous procedures have been developed for preventing an inflow of sand. Generally effective treatments are provided by injecting into the reservoir formations resin-forming solutions that bind the granular formation materials into permeable integral structures surrounding the points of fluid communication between the borehole and the reservoir.

Such "in situ" sand consolidation procedures are advantageous relative to uses of liners, gravelpacks, etc., since they avoid any impediments to production within the interior of the borehole. Certain epoxy resins are capable of providing sand consolidations that are relatively resistant to the action of solvents, brine, acids, etc. Which may be flowed through the consolidated sand during the operation of the well.

Previously proposed sand consolidating well treatments that use resin solutions from which self-curing partially polymerized epoxy resins are precipitated are described in U.S. Pat. Nos. such as 3,294,166 by Havenaar and Meys and 3,123,138 by Robichaux. Those patents teach that the resin-forming solution should be displaced out of the interior of the well and into the surrounding unconsolidated sand. For example, they indicate that in a cased and perforated borehole, the resin-forming solution should be displaced into and through the perforation tunnels in order to prevent the precipitation of resin within the interior of the casing.

It was previously believed to be important to insure that substantially all of such a resin-forming solution be displaced out of the borehole. This led to field practices of overdisplacing the resin solution from the borehole by at least one-half barrel or more of fluid. Such overdisplacements leave an unconsolidated region of about 1½ barrel adjacent to the borehole and, for example, in a 4-foot interval where the porosity is 33 percent, the unconsolidated region may extend for about six inches into the reservoir formation. The overdisplacement in the critical area outside the casing and the perforation channels has been a major cause of sand consolidation failure.

SUMMARY OF THE INVENTION

In accordance with this invention, a reservoir formation that is encountered by a cased and perforated well and is unconsolidated or is likely to become unconsolidated is treated by injecting a specific type of sand consolidating resin-forming solution in a specific way. The resin solution used is one from which a self-curing partially polymerized epoxy resin is precipitated after the solution has been displaced into the well and into the sand. The resin solution is injected so that it both permeates a selected portion of the sand that is immediately adjacent to the borehole and fills the perforated interval of the casing, i.e., the portion that is immediately adjacent to and in fluid communication with the sand.

In a preferred injection procedure, a fluid confining conduit is disposed between a surface location and the treated portion of the borehole, i.e., the portion that is immediately adjacent to and in fluid communication with the sand to be consolidated. The conduit and the treated portion of the borehole are filled with fluid that is free of fluid-transportable solid material. Sand treating fluid inclusive of a resin solution-compatible buffer liquid and the specified resin-forming solution is pumped into the conduit, with the amount of the resin-forming solution being sufficient to fill both the treated portion of the borehole and the zone to be consolidated within the sand. The sand treating fluid is followed by a fluid that is compatible with the resin-forming solution and has a volume that is just sufficient to fill the conduit and treated portion of the borehole from the surface location to a depth above but near that of the upper level of fluid communication between the borehole and the sand (i.e., the upper preforation in a well that is cased and perofrated). And, these fluids are pumped into and through the conduit to the extent that the resin solution is positioned within both the sand the immediately adjacent portion of the borehole. Where the borehole is cased and perforated, this positions the resin-forming solution so that the resin is precipitated and cured inside the casing, throughout the perforated interval and (preferably) a significant distance above that interval. This insures that all of the sand in the vicinity of the perforations inside and outside of the casing is consolidated. The hardened resin and/or sand in the casing is subsequently removed, by a fluid circulation or fluid-washing that may be supplemented by drilling, where necessary.

This invention is, at least in part, premised on a discovery of advantages that are provided by (1) using a resin solution that subsequently precipitates a sand consolidating resin material and (2) contra to what was previously believed to be a step to be avoided — positioning that solution so that a portion remains within the borehole while the resin is precipitated and cured to form a solid. This amounts to an underdisplacement of the resin solution (relative to displacing it out of the borehole and into the reservoir). In field tests such underdisplaced sand consolidations exhibit a success ratio which is significantly higher than those in which substantially all of the resin solution was displaced out of the borehole.

In a preferred embodiment of the invention, the fluid injected ahead of the resin-forming solution includes an acidizing fluid and at least one preflush solution to prepare the formation sand for consolidation. The resin-forming solution and/or a preflush solution preferably includes a sand grain bonding agent such as a silane of the type described in the Bezemer, Meijs and VanZanten U.S. Pat. No. 3,368,626 or Bezemer, Meijs, VanZanten and Whittenweyler U.S. Pat. No. 3,476,189.

DESCRIPTION OF THE INVENTION

Figure 1:
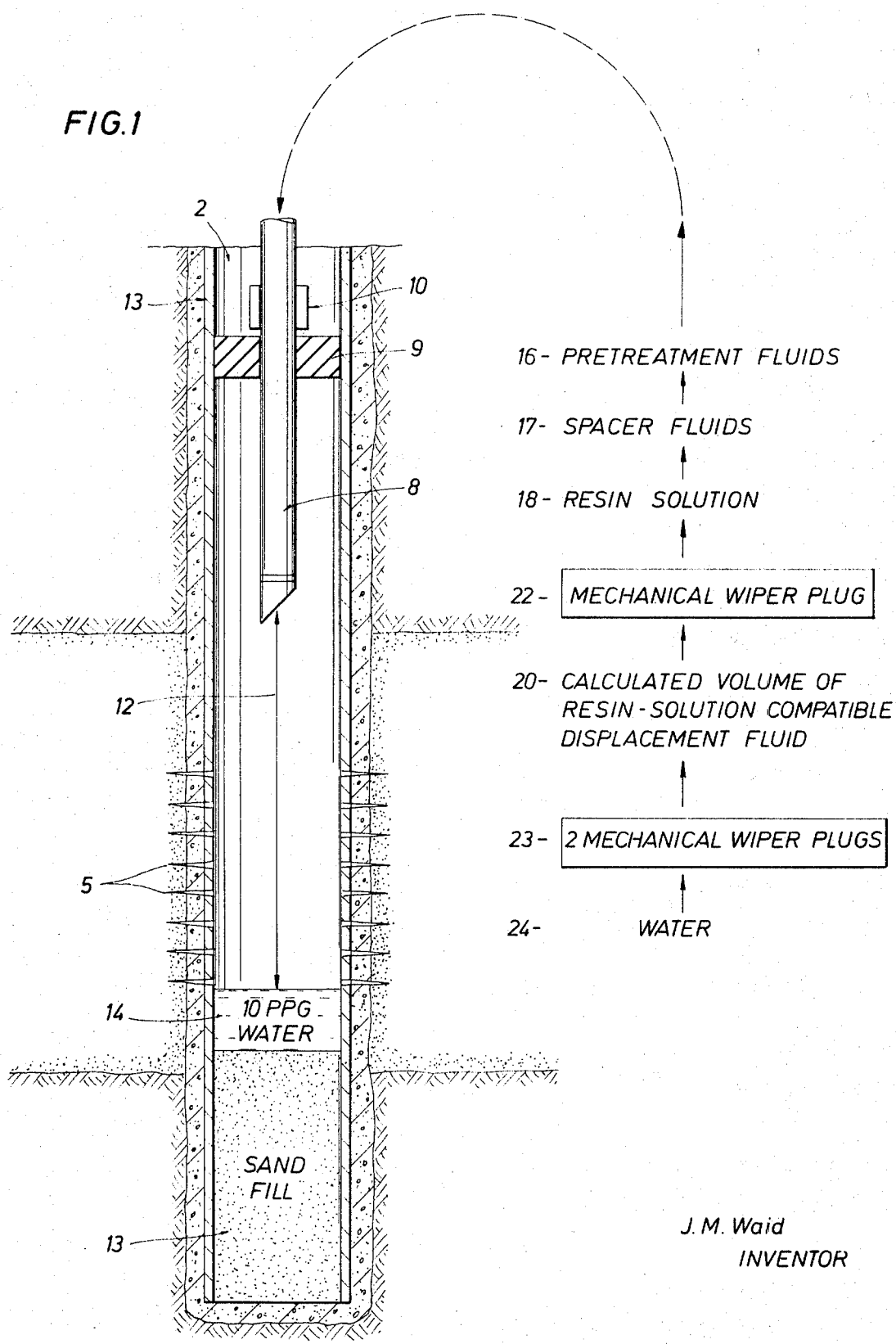
FIG. 1 is a schematic illustration of a sequence of fluids flowing into a well in which this invention is being practiced.

FIG. 1 shows borehole 2 containing casing 3 (surrounded by a sheath of cement, not shown. The casing and cement are penetrated by perforations 5, which provide perforation tunnels extending from within the borehole to within the earth formation to be treated. In the borehole, pipe string 8 is surrounded by packer 9, such as a squeeze packer, that seals the annular space between the pipe and the casing. Pipe string 8 is preferably equipped with a plug catching device 10 for trapping fluid-transported wiper plugs for isolating fluids pumped through pipe 8. Such equipment can be installed by means of systems and services that are commercially available.

The invention can be used in treatments initiated during the initial completion of a well or in remedial treatments of previously completed wells that have produced sand. Any sand that flows into the perforated portion of the borehole, tends to fall into the "rathole" portion, below the lowermost perforation. Such inflowed sand is preferably circulated out, or washed out, prior to a sand consolidation treatment.

In a sand washing operation, fluid may be pumped into borehole through the casing annulus (the space between pipe 8 and casing 3) while fluid containing entrained sand is circulated out through pipe 8, with the latter being lowered as required to keep it near the top of the sand. After such a sand washing operation, an inert liquid such as a light oil, for example, diesel oil or kerosene, is circulated within the borehole, preferably along the same path, to fill the casing annulus with inert liquid. In certain situations, where the effective formation pressure is greater than the hydrostatic head of the liquid and the annulus remains full of liquid when the inflowing of liquid has stopped, the sand consolidating operation can be conducted without installing a packer on tubing 8, but the use of such a packer is preferred. In treating a new well or a well in which the sand inflow was minor, a production tubing string can be equipped and utilized as a conduit through which the sand consolidating resin-forming solution is injected.

The above described circulation of fluid through the casing and tubing removes the portion containing entrained sand and thus frees the fluid (within the conduits extending between the surface location and the interval of fluid communication with the reservoir) of fluid-entrained solid material. Such a circulation is preferably conducted with the fluid inflowing through casing 3 and outflowing through pipe 8 while pipe 8 is positioned to end near the top of the perforated interval. Alternatively, the fluid within such conduits can be freed of fluid-entrained solids by keeping the fluid stationary long enough to allow substantially all of the entrained solids to settle into the rathole portion of the borehole and/or by substantially any washing or settling procedure for removing entrained particles.

In FIG. 1, the vertical distance 12 is the height of the casing interval to be occupied by underdisplaced resin. That distance extends from the lowest perforation or level of fluid communication between the borehole and sand through the perforated interval to just below the treating string (e.g., positioned some 15–20 feet above the uppermost perforation), and/or below the lower end of flow control equipment such as pipe string 8, packer 9, plug catcher 10, or the like. As shown in the drawing, a lower boundary for such a selected treatment volume or casing interval can be formed by filling the lower portion of the casing with sand fill 13 topped by (and impregnated with) a layer of relatively high-density liquid 14, such as an aqueous solution of a neutral salt, such as sodium chloride. The sand and brine filling can be disposed above the bottom of a borehole but below the perforated interval of casing. Then the amount of resin displacing fluid required to fill such a selected treatment volume to a location above the upper perforations is calculated and utilized in positioning the resin-forming solution.

Figure 2:
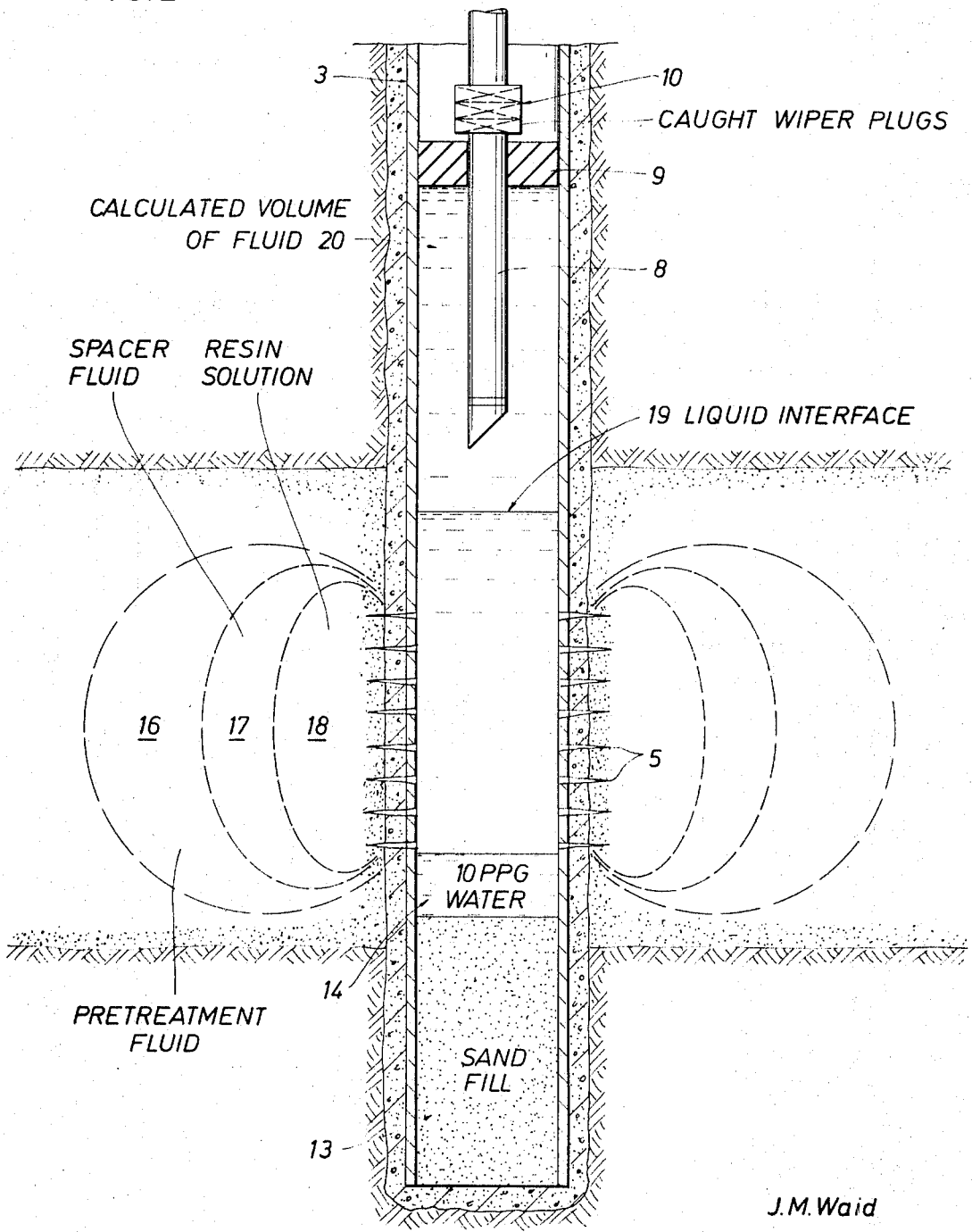
FIG. 2 is a schematic cross-sectional view of a portion of a well and an adjacent sand that was treated as shown in FIG. 1.

As shown in FIG. 1, sand treating fluid inclusive of a pre-treatment fluid 16, a spacer fluid 17 and a resin-forming solution 18 is pumped into pipe string 8. That pipe string comprises a conduit extending between a surface location (not shown) and the treated portion of the borehole. The volume of the resin-forming solution 18 should be just sufficient to penetrate a selected distance into the adjacent reservoir formation (to consolidate the formation) while leaving enough liquid within the selected treatment interval to extend above the upper perforation to a liquid interface 19 (FIG. 2) located between the uppermost perforation and the bottom of the lowermost item of fluid control equipment, such as pipe string 8. In a preferred procedure, the resin-forming solution is followed by a calculated fluid volume 20 (of fluid which is compatible with the resin-forming solution) that is just sufficient to fill the space between interface 19 and the plug catching device 10. The calculated fluid volume 20 is disposed within pipe string 8 between mechanical wiper plugs 22 and 23 which each provide a detectable indication at a surface location when they arrive in the plug catching device 10. When plug 23 arrives, the operator is assured that resin-forming solution 18 has been displaced into the treatment zone with enough remaining in the borehole to fill it from below the lowest perforation to above the uppermost perforation, at interface 19. The sand treating fluids and the calculated fluid volume that follows them can be displaced into the treated interval by pumping substantially any non harmful fluid, such as water 24, into the conduit pipe 8 until the arrival of the calculated fluid in the treatment interval has been indicated by a pressure increase that signals that the final wiper plug has latched in and will prevent communication to the casing below.

Indications of the arrival of the calculated volume of fluid at the treatment interval can be obtained in various ways aside from the pressure increase described above which is preferred. The amount of the calculated fluid volume can be sufficient to fill pipe string 8 and the upper portion of the treatment interval all the way from the surface location to a depth such as that of interface 19 so that when this amount of fluid has been pumped into pipe 8 (with or without mechanical wiper plug indicating devices), it is known that the arrival has occurred when the last of the calculated volume has passed the pumping device. A high degree of accuracy of measurement is necessary with this method. Such a procedure can also be followed when water or other economically available fluid is used to effect part of the displacement, as long as a resin solution-compatible fluid is positioned immediately behind the resin solution and a positive separating device such as a wiper plug is used to precede the water so that none of the immiscible or incompatible fluid is allowed to come into contact with the resin solution.

In general, suitable sand treating fluids include a first injected water-displacing fluid, such as fluid 16, followed by a spacer fluid, such as fluid 17, and resin solution 18. Suitable formulations for such fluids are disclosed in greater detail in the above-mentioned U.S.

Pat. Nos. 3,123,138; 3,294,166; and 3,368,626. Such sand treating fluids are preferably kept free of fluid-transported solid materials, such as wiper plugs, entrained particles of solids, or the like.

The resin solution used in the present invention is a resin-precipitating solution containing a polyepoxide having more than one vicinal epoxy group per molecule and an amine capable of acting as curing agent for the polyepoxide dissolved in a special liquid solvent vehicle which has a significant but limited solubility for the intermediate resin product, so as to keep dissolved the amount of intermediate resin product formed during the time required to pump said solution into an earth formation to be treated and yet cause a self-curing incompletely polymerized resin to separate from the solvent after the solution is spotted in the reservoir. The resin-forming solution is positioned within the borehole and reservoir by displacing it ahead of a measured, and preselected, volume of liquid. This calculated volume of liquid is a hydrocarbon which is inert to and compatible with the resin-forming solution, for example, a liquid similar to that used as a spacer fluid. The calculated volume of resin displacement fluid is preferably preceded and followed by wiper plugs to allow water to be used to displace the fluid column to bottom where the last wiper plug seals off the tubing and curing takes place. The total displacement volume (resin displacing fluid plus tubing displacement fluid) pumped into the conduit between the surface location and the resin-forming liquid is sufficient to fill the conduit from the surface location to a depth near but above the depth of the uppermost level of communication between the borehole and the reservoir. In a preferred embodiment it fills a conduit such as tubing 8 and the packer isolated portion of casing 3 to a depth (such as that of interface 19 between the resin solution and the displacing liquid) that is near but above the uppermost level of communication between the borehole and the reservoir.

Unobviously, after a well is placed on production following a treatment by the process of the present invention, the well will characteristically produce minor amounts of sand until the well stabilizes, usually in several days. Such sand may result in a very routine operation to circulate out sand fill from the well. However, the success ratio and permeability index of sand consolidations in which the resin has been so positioned is so much greater than those in which the resin was positioned in accordance with previously proposed procedures that the operational efficiency is improved.

In many well completions a casing is cemented into a borehole and is perforated in order to provide an opening between the borehole and the reservoir. In such operations, the perforations are preferably cleaned as soon as they are formed by backflowing fluid into the borehole, for example, by means of commercially available techniques and equipment, such as a Johnston Backsurge Tool. If the perforations being treated are receptive of fluid, the fluid then standing in the injection tubing is squeezed into the formation and may be followed by an injection of acid.

Such an acidization is preferably effected by injecting in the order of 150 to 250 gallons of a matrix acidizing acid, such as aqueous 15% HCl, followed by an amount in the order of 250 to 500 gallons of a mud acid, such as aqueous 12% HCl plus aqueous 3% HF. In general, substantially any of the commercially available matrix and/or mud acidization formulations and/or inhibitors, or the like, can be used. After such an acidization, the sand consolidating resin solution pretreatment fluids are injected immediately ahead of a resin-forming solution.

What is claimed is:

1. In a sand consolidating treatment of a cased and perforated well in which a solution of sand consolidating resin-forming material is injected into the reservoir formation adjacent to the borehole of a well, the improvement which comprises:

using a resin-forming solution from which a self-curing partially polymerized epoxy resin is precipitated after the solution has been displaced into the well and into the reservoir formulation;

using an amount of said resin-forming solution that is adapted to both permeate a selected volume of the reservoir formation that is immediately adjacent to the perforated interval of casing and fill the perforated interval of casing; and displacing some but not all of said resin-forming solution through the well and into the reservoir formation so that a column of the solution remains within the perforated interval of casing and extends throughout that interval.

2. The process of claim 1 including the steps of:

extending a fluid confining conduit between said surface location and said cased and perforated interval of borehole; and displacing said resin-forming solution through said conduit ahead of a volume of fluid just sufficient to fill the conduit and the cased and perforated interval of borehole from the surface location to a depth above the uppermost perforation.

3. The process of claim 2 in which said conduit is provided with wiper plug catching means and a wiper plug is fluid-transported immediately behind a measured volume of liquid that effectively underdisplaces the resin-forming solution into the sand by displacing it to a level just above the uppermost level of communication with the sand and leaving the measured volume of liquid in the space within the casing from the level above the uppermost perforation to the plug catching device.

4. The process of claim 1 in which resin precipitated from said resin-forming solution is allowed to solidify and the resin formed within the casing is removed from the perforated interval of casing.

* * * * *